3,334,972
METHOD AND APPARATUS FOR THE HEAT TREATMENT OF SYNTHETIC MICA
Albert K. Levine, 10—46 Utopia Parkway, Beechhurst, N.Y. 11357, and Samuel Natansohn, 19 Joan Lane, Massapequa Park, N.Y. 11762
Filed June 7, 1965, Ser. No. 469,019
9 Claims. (Cl. 23—305)

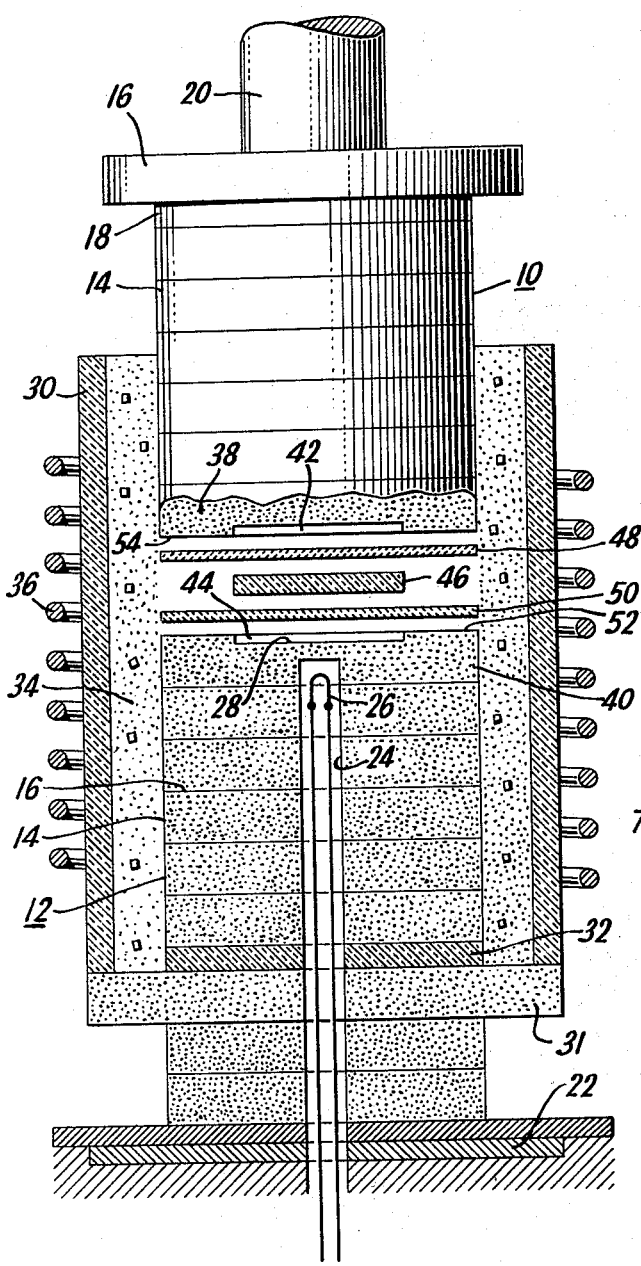
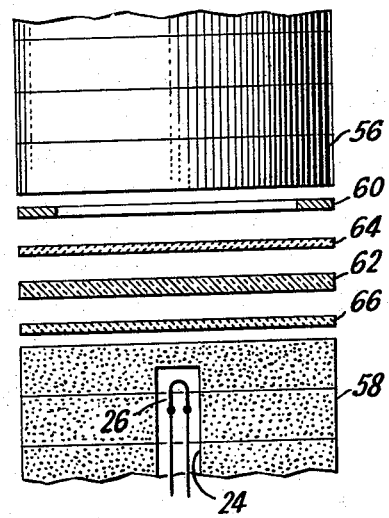
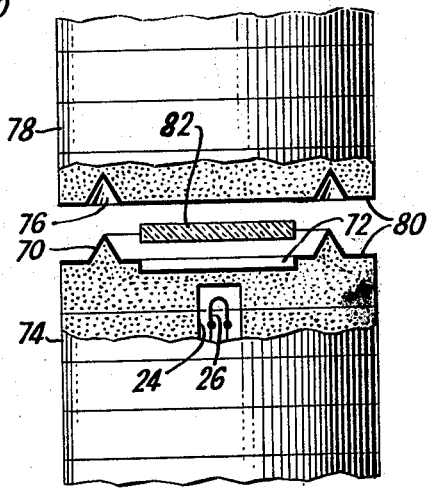
INVENTORS
ALBERT K. LEVINE
SAMUEL NATANSOHN
BY
Robert J. Frank
AGENT United States Patent Office — 3,334,972, Patented Aug. 8, 1967

This application is a continuation-in-part of our co-pending application Ser. No. 18,696 filed Mar. 30, 1960, now abandoned.

This invention relates to synthetic mica and in particular to an apparatus and method for growing single crystalline sheets of synthetic fluorphlogopite mica.

The term "mica" is used to define materials belonging to a group of potassium aluminum silicate minerals and derivatives thereof which have high dielectric strength and which possess a characteristic crystallographic sheet-like structure. This material is generally flexible and transparent and can be divided and subdivided into extremely thin sheets.

A single sheet of mica structure consists essentially of two tetrahedrally coordinated $(AlSi_3O_{10})_n$ layers which are bound together by a layer of appropriate anions (hydroxyl or fluoride) and cations (aluminum or magnesium). Potassium ions separate each set of these three layers from its neighbors and this sequence of layers is repeated indefinitely to form the mica sheets. Natural muscovite, which has the formula

$$K_2Al_4(Al_2Si_6O_{20})(OH)_4$$

is used as a dielectric material in capacitors, as electrode supports in vacuum tubes, and as an insulator in many other types of electrical and electronic devices. Other types of natural mica, such as phlogopite having the formula $K_2Mg_6(Al_2Si_6O_{20})(OH)_4$, can also be used for such purposes.

However, these natural micas have certain inherent disadvantages. For example, at temperatures above approximately 800° C., mica tends to lose hydroxyl ions and its electrical and mechanical properties deteriorate. Further, since mica is a mineral and exists in various forms, its properties are not consistently uniform. In addition, most of the deposits of high quality natural sheet mica are found abroad and, therefore, are not always readily obtainable in this country in the required quantities.

Accordingly, attempts have been made to produce mica synthetically. One of the most suitable replacements for natural mica is synthetic fluorphlogopite or fluormica having the formula $K_2Mg_6Al_2Si_6O_{20}F_4$. In this synthetic mica, fluoride ions replace the hydroxyl ions found in natural mica. The fluoride ions differ from the hydroxyl ions in that the fluoride ions cannot react to form water when the mica is heated. For this reason the thermal stability of synthetic mica is substantially superior to that of the natural material. Moreover, the properties of the synthetic product are more nearly uniform than those of natural mica.

Fluorphlogopite can be synthesized commercially on a large scale by the melting of a batch of raw materials which may consist for example of $Al_2O_3$, $MgO$, $SiO_2$ and $K_2SiF_6$. In one particular method, the interior portion of the batch is melted preferentially by passing a current between two suitably placed graphite electrodes. In this way, a liquid-solid interface encompassing the entire melt is created, the interface tending to confine the system thereby reducing the loss of fluoride by volatization. The outer strata of the reaction mixture and the reaction vessel itself remain at a temperature which is considerably lower than the melted interior portion. The fluormica synthesized by this process consists of large crystals of random orientation which are so grown into one another at various interlocking angles that it is extremely difficult and expensive to separate them into single sheets. Such synthetic mica is used commercially by comminuting it to a powder and then consolidating it into dense ceramic structures. However, it is not suitable in this form for use in electronic applications, such as electron tube spacers, since these require the elasticity and dielectric properties possessed only by planar single crystals.

Subsequent to the development of a commercial method of manufacturing fluorphlogopite, a number of attempts were made to grow the material as oriented crystals of uniform thickness. One approach was to disintegrate the intergrown mass of large crystals into very small single crystal flakes. These were aligned by an aqueous settling technique (such as is used in paper making) which causes the crystal flakes to be oriented so that they form a sheet with their cleavage planes parallel. Consolidation of this sheet was attempted by heating the oriented fluormica flakes at temperatures up to their melting point while simultaneously applying pressures up to 10,000 p.s.i. Sintering took place, but the sheets had densities far below the crystal density and were porous, fragile and brittle. In addition, when the sintering process was attempted above 1300° C. (a temperature well below the melting point of mica) non-micaceous impurities were found in the final product because of the extensive loss of volatile decomposition products of fluorphlogopite.

Attempts have also been made to grow single crystals of fluorphlogopite from the melt. However, these attempts have had only limited success because it is difficult to establish stable conditions at the melt-solid interface because of the change in stoichiometry which results from the rapid volatization of fluorides at temperatures near the melting point. Thus, present methods of growing single crystal fluorphlogopite from the melt can not be used to grow specimens large enough for commercial applications.

Accordingly, it is an object of our invention to provide an improved method for growing single crystal sheets of synthetic fluorphlogopite mica.

Another object is to provide apparatus for growing single crystal sheets of fluorphlogopite mica at temperatures above the melting point of the material.

Still another object of the invention is to provide a method and apparatus for producing single crystalline synthetic mica sheets of desired uniform thickness.

A further object of the invention is to produce single crystal sheets of synthetic fluorphlogopite mica having greatly improved electrical and mechanical properties.

These and other objects are attained in the present invention in which a method is presented for growing single crystal synthetic mica sheets from the melt in a confining system which prevents loss of volatiles. The geometry of the confining system insures thermodynamic equilibrium among the crystalline, liquid and vapor phases during the process. The apparatus permits the growth of thin crystalline sheets of mica of uniform thickness and orientation suitable for commercial application whereas such sheets cannot be obtained by growth in a crucible.

In accordance with our method, substantially pure synthetic mica consisting of randomly oriented large crystals intergrown into one another is crushed and then either delaminated into very fine flakes or ground to a powder. The finely divided synthetic mica charge is then placed between a pair of refractory metal sheets and the resulting metal-mica-metal sandwich inserted between a pair of mating compression members having first and second oppositely located depressions therein. The edges of the refractory metal sheets are brought into contact under pressure, and the temperature within the enclosure is raised above the melting point of the synthetic mica. The peak temperature is held for a period of time sufficient to dissolve any residual crystalline nuclei from the original synthetic mica charge and the temperature then reduced slowly through the freezing point of the mica. The mica melt within the enclosure is confined by and in contact with the refractory sheets which provide two orienting surfaces during crystal growth. Crystallization readily occurs upon cooling from this temperature and practically none of the mica is lost by volatization since the process takes place in a confined system.

In another embodiment of the invention, an annular refractory member forms part of the outer portion of the mating surface of one of the compression members. Synthetic mica flakes or powder are placed between the compression members. The force applied to the compression members is concentrated on the surface of the annular member thereby increasing the pressure around the periphery of the mica permitting the crystallization to take place in a confined volume.

The above objects of and the brief introduction to the present invention will be more fully understood and further objects and advantages will become apparent from a study of the following description in connection with the drawings, wherein:

FIG. 1 is a sectional view of one embodiment of the apparatus for forming sheets of single crystal synthetic mica; and FIGS. 2 and 3 are sectional views of portions of other forms of apparatus for carrying out the invention.

Referring to FIG. 1, there is shown first and second coaxial compression members 10 and 12, each consisting of a stack of graphite blocks 14. Compression member 10 is provided with a cooling plate 16 separated from the graphite stack by a disc of refractory aluminum oxide 18. A ram 20 which is operated by a hydraulic mechanism (not shown) is used to force compression members 10 and 12 together. Compression member 12 is affixed to a cooling plate 22 and is further provided with a thermocouple receptacle 24 extending through cooling plate 22. A thermocouple 26 placed in receptacle 24 provides a satisfactory indication of the temperature near the surface 28 of compression member 12. A hollow quartz cylinder 30 surrounds the compression members, being supported by a graphite block 31 which is insulated from the compression member 12 by a disc of refractory aluminum oxide 32. The space between the quartz cylinder 30 and members 10 and 12 is filled with a mixture 34 of graphite and aluminum oxide, the aluminum oxide acting both as an insulator and to reduce eddy currents. The purpose of the carbon is to prevent oxidation of the graphite. An induction coil 36 surrounds the quartz cylinder and is provided with current having a frequency of 500 kilocycles per second in the particular apparatus used. Radiant heating, as well as other heating methods, may also be used.

The central portions of the mating graphite blocks 38 and 40 are hollowed out to form depressions or wells 42 and 44 which receive the synthetic mica sample 46. The total depth of the two wells is the same as the desired thickness of the sample, usually 0.008 to 0.05 cm. The mica sample 46 is obtained by crushing synthetic fluorphlogopite $K_2Mg_6Al_2Si_6O_{20}F_4$ and then either delaminating it into very fine flakes or grinding it to a power. While the dimensions of the flakes or powder are not critical, flakes having the largest dimension in the range 100 to 1000 microns and powders having particles with average diameters of 10 microns or less are preferred. The finely divided mica 46 is then deposited as a circular layer about 7 cm. in diameter between two 0.02 cm. thick molybdenum discs 48 and 50, disc 48 and 50 being about 10 cm. in diameter. Molybdenum was selected as the container material because it withstands the corrosiveness of molten fluorphlogopite, has the necessary elasticity to for a pressure seal, and separates easily and clearly from the crystallized fluormica. The thickness of molybdenum sheets 48 and 50 has been somewhat exaggerated in the drawing for greater clarity.

The molybdenum-mica-molybdenum sandwich is then placed between the graphite blocks 38 and 40. When the ram 20 is translated downward, the sealing lips 52 and 54 of the blocks bring the peripheries of the molybdenum discs 48 and 50 forcibly into contact with each other, the mica within the volume defined by wells 42 and 44 being effectively confined.

The amount of finely divided fluorphlogopite used is equal to the amount required to fill the cavity between the sealed molybdenum discs 48 and 50 at the crystal density (2.8 grams per cubic centimeter) of the mica. (When experiments were conducted in which the amount of material was less than that required to fill the cavity at the crystal density of mica, the obtained samples were discontinuous and disoriented.) The bulk density of the fluorphlogopite layer (about 1.5 gram per cubic centimeter) is considerably smaller than the crystal density and therefore the thickness of the layer exceeds the combined depth of the two wells 42 and 44. Thus, when pressure is applied to the peripheries of molybdenum disc 48 and 50 there is still elastic deformation of the molybdenum, and the fluormica is forced into wells 42 and 44. Shallow depressions are formed in discs 48 and 50 which conform to the shape of wells 42 and 44. The pressure at the peripheries of the discs 48 and 50 is maintained at about 1000 p.s.i The mica is next heated above its melting point by passing alternating current through induction coil 36. As the temperature rises above 1000° C., the fluorphlogopite densifies thereby decreasing in volume and the graphite supporting the molybdenum deforms slightly. As a result the broad peripheral regions of the molybdenum discs 48 and 50 are squeezed even more tightly together and the system is effectively sealed.

It has been determined that the peak temperature of the mica must be maintained within the approximate range 1380° C. to 1390° C., as measured by thermocouple 26. Experiments carried out several degrees below 1380° C. yielded only highly polycrystalline fluorphlogopite whereas when the temperature was raised several degrees above 1390° C. for as little as 5 to 10 minutes non-micaceous impurities were found. It is believed that at peak temperatures much above 1390° C. the liquid-vapor equilibrium is shifted toward a condition that favors formation of solid phases other than fluorphlogopite such as forsterite and various glasses.

It is necessary to hold the system at peak temperature for a period of time sufficient to dissolve any residual crystalline nuclei from the original fluorphlogopite charge. About one hour has been found to be an optimum period for this step of the process.

The temperature must be decreased slowly and steplessly through the freezing point which has been found to be in the approximate range 1380° C. to 1390° C. Best results are obtained when the cooling rate is adjusted to between 1° C. and 3° C. per hour until the entire confined system is several degrees below the freezing point after which the cooling rate may be progressively increased. A cooling rate through the freezing point less than 1 degree per hour is difficult to obtain in practice although it will result in an entirely satisfactory product. Rates exceeding 10 degrees per hour however produce excessive nucleation and the resultant fluorphlogopite sheet is composed of a large number of minute crystallites. The cooling need be programmed only until the temperature has dropped 100 to 150 degrees below the peak temperature after which the power may be shut off. The crystallized material exhibits no damage as a result of the rapid return to room temperature.

To obtain single crystal growth from a melt it is desirable that initial crystallization occur only in one microscopic spot, and that all subsequent crystallization extend from that growing center. Since induction heating is employed, there is a radial temperature gradient across the graphite blocks 38 and 40 which is greatest at the perimeter of the confined fluormica melt and decreases toward the center. Thus, as the temperature is decreased slowly, the center of the molten layer reaches the freezing point before the remainder and crystallizes first. During the subsequent slow cooling program the crystallization front advances radially, an advance of about 2 cm./hour being obtained when the cooling rate was maintained at 2° C. per hour.

The particular arrangement used which consists of shallow wells in which the melt is confined and is in contact with clean molybdenum sheet surfaces promotes crystal growth in the lateral direction only. This apparatus eliminates the common disadvantage of prior attempts to grow single crystals of synthetic mica is sealed crucibles which results in small crystals randomly intergrown in many directions. The sheet crystals grown by this method are either single crystals or consist of a few well intergrown single crystals all oriented in one direction. These can be used directly, without further processing in industrial applications in contrast to the products obtained in bulk crystallization methods which require lengthy and costly separation and reconstitution procedure before they can be utilized commercially.

Using our method and apparatus synthetic fluorphlogopite sheets approaching monocrystallinity were grown having diameters up to 7 cm. and thicknesses in the preferred range 0.008 to 0.25 cm., the diameter being limited only by the dimensions of the apparatus. While sheets of greater thickness can be grown, it has been found that the maximum practical thickness is about 0.05 cm. The sheets are transparent, flexible and have excellent dielectric strength. Occasionally, surface deposits of non-micaceous matter have occurred but they are not deleterious and can be removed by mild abrasion. Detailed microscopic examination of the sheets shows homogeneous crystalline growth with uniform lamellar orientation throughout the body. Transmission Lave photographs taken at several different locations on the same fluormica sheet show unambiguous single crystalline patterns with the same orientation.

The dielectric strength of the synthetic mica sheet crystals grown to various thicknesses were prepared with those of single crystal flakes of natural muscovite mica (Grade No. 6 std. A/B) and with single crystal flakes of synthetic fluorphlogopite obtained by meticulous separation from a large chunk containing randomly intergrown crystals. The measurements showed that the dielectric strength of the fluorphologopite sheet of crystals grown by our method are superior to that of single crystals extracted from commercial preparation of randomly intergrown crystals although somewhat inferior to muscovite. It should be noted that the dielectric strength measurements indicate not only the dielectric quality of the specimen but also their crystalline and mechanical perfection. That is because inhomogeneities such as cracks, pinholes, disoriented crystal growth and nucleation centers provide a current leakage-path lowering the measured value of breakdown voltage.

The mechanical integrity of the crystalline sheets of fluorphlogopite grown by our method is further confirmed by the high modulus of rupture value of 70,000 p.s.i. which matches that measured on single crystals extracted from the randomly intergrown mass obtained by the large-scale synthesis described.

The following table provides a comparison between the test results obtained with typical synthetic mica sheets made by our method and single crystals of muscovite of comparable thickness.

|  | Synthetic Mica Sheet | Muscovite (Grade 6 Std. A/B) |
| --- | --- | --- |
| Thickness | 7.2 | 7.6 |
| Dielectric Strength (volts/mil) | 1,210 | 1,130 |
| Modulus of Rupture (p.s.i.) | 71,400 | 94,000 |

An alternative form of the apparatus of FIG. 1 consists of a pair of compression members wherein only one of these members has a centrally located well or depression. The depth of this well should not be much smaller than the thickness of the finely divided mica sample and the diameter of the well should correspond to the desired diameter of the resultant synthetic mica sheet.

FIG. 2 shows another embodiment of the invention in which a confined system is provided by placing an annular molybdenum ring 60 having an outer diameter equal to the diameter of the mica layer 62 between a molybdenum sheet 64 and the compression member 56. A second molybdenum sheet 66 is located between the mica 62 and compression member 58. When pressure is applied to members 56 and 58 thereby bringing them forcibly together, the added thickness at the periphery of the mica layer 62 provides an effective seal and prevents loss of the mica being treated. The portion of the mica 62 having a diameter less than the diameter of ring 60 is converted to a recrystallized form by heating the assembly above the melting point of the mica and subsequently cooling it at a predetermined rate.

FIG. 3 illustrates a form of the invention in which a ridge 70 is machined in compression member 74 around the periphery of a well 72 so that it fits into a corresponding groove 76 in the upper graphite compression member 78. The inside of well 72 and the sealing periphery are clad with foil of a refractory metal 80 such as molybdenum or platinum and the mica flakes or powder 82 placed between them.

As many changes could be made in the above described apparatus and method and many different embodiments could be made without departing from the scope thereof, it is intended that all matter contained in the above description or shown in the accompanying drawings shall be interpreted as illustrative and not in a limiting sense.

What is claimed is:
1. The method of growing essentially single crystal sheets of synthetic mica comprising the steps of
(a) inserting a pair of refractory metal sheets with a finely divided substantially pure synthetic mica charge interposed therebetween between a pair of mating compression members having oppositely located first and second depressions therein, said mica charge being located in the volume encompassed by said depressions,
(b) bringing the peripheries of said metal sheets into contact with each other under pressure to produce a sealed enclosure surrounding said charge,
(c) raising the temperature of said enclosure to within a range above the melting point of said mica and below the temperature at which non-micaceous impurities are formed,
(d) maintaining the temperature of said enclosure within said temperature range until individual crystallized nuclei from the original synthetic mica charge have been dissolved, and
(e) cooling said enclosure at a controlled rate not exceeding 10° C. per hour through the freezing point of said synthetic mica, contact being maintained between the refractory sheets and the molten charge throughout the crystallization period thereby promoting lateral crystal growth.

2. The method of growing essentially single crystal sheets of synthetic mica comprising the steps of
(a) inserting a pair of refractory metal sheets with a finely divided substantially pure synthetic mica charge interposed therebetween between a pair of mating compression members having oppositely located first and second depressions therein, said mica charge being located in the volume encompassed by said depressions, the total depth of said first and second depressions being substantially equal to the thickness of the desired sheet of synthetic mica, (b) bringing the peripheries of said metal sheets into contact with each other under pressure to produce a sealed enclosure surrounding said charge, (c) raising the temperature of said enclosure to within a range above the melting point of said synthetic mica and below the temperature at which non-micaceous impurities are formed, (d) maintaining the temperature of said enclosure within said temperature range until individual crystallized nuclei from the original synthetic mica charge have been dissolved, and (e) cooling said enclosure at a controlled rate not exceeding 10° C. per hour through the freezing point of said synthetic mica, contact being maintained between the refractory sheets and the molten charge throughout the crystallization period thereby promoting lateral crystal growth.

3. The method of growing essentially single crystal sheets of synthetic mica comprising the steps of (a) inserting a pair of refractory metal sheets with a finely divided substantially pure synthetic mica charge interposed therebetween between a pair of mating compression members having oppositely located first and second depressions therein, said mica charge being located in the volume encompassed by said depression, the total depth of said first and second depressions being substantially equal to the thickness of the desired sheet of synthetic mica, (b) bringing the peripheries of said metal sheets into contact with each other under pressure to produce a sealed enclosure surrounding said charge, (c) raising the temperature of said enclosure to within a range above the melting point of said synthetic mica and below the temperature at which non-micaceous impurities are formed to produce a thermal gradient which is maximum at the perimeter of said enclosure and which decreases radially toward the center, (d) maintaining the temperature of said enclosure within said temperature range until individual crystallized nuclei from the original synthetic mica charge have been dissolved, and (e) cooling said enclosure at a controlled rate not exceeding 10° C. per hour, contact being maintained between the refractory sheets and the molten charge throughout the crystallization period thereby promoting crystal growth, crystallization of said synthetic mica occurring first at the center of said enclosure and then proceeding radially toward the perimeter thereof.

4. The method of growing essentially single crystal sheets of synthetic mica comprising the steps of (a) inserting a pair of refractory metal sheets with a finely divided substantially pure synthetic mica charge interposed therebetween between a pair of mating compression members having oppositely located first and second depressions therein, said mica charge being located in the volume encompassed by said depressions, the total depth of said first and second depressions being substantially equal to the thickness of the desired sheet of synthetic mica, (b) bringing the peripheries of said metal sheets into contact with each other under pressure to produce a sealed enclosure surrounding said charge, (c) raising the temperature of said enclosure above the melting point of said synthetic mica to a temperature in the range 1380° C. to 1390° C. to produce a thermal gradient which is maximum at the perimeter of said enclosure and which decreases radially toward the center, (d) maintaining the temperature of said enclosure within said temperature range until individual crystallized nuclei from the original synthetic mica charge have been dissolved, and (e) cooling said enclosure through the freezing point of said synthetic mica at a controlled rate not exceeding 10° C. per hour, contact being maintained between the refractory sheets and the molten charge throughout the crystallization period thereby promoting lateral crystal growth, the crystallization of said synthetic mica occurring first at the center of said enclosure and then proceeding radially toward the perimeter thereof.

5. The method of growing essentially single crystal sheets of synthetic mica comprising the steps of (a) inserting a pair of refractory metal sheets with a finely divided substantially pure synthetic mica charge interposed therebetween between a pair of mating compression members having oppositely located first and second depressions therein, said mica charge being located in the volume encompassed by said depressions and having a volume equal to that required to fill said depressions with synthetic mica at its crystal density, (b) bringing the peripheries of said metal sheets into contact with each other under pressure to produce a sealed enclosure surrounding said charge, (c) raising the temperature of said enclosure to within a range above the melting point of said synthetic mica and below the temperature at which non-micaceous impurities are formed to produce a thermal gradient which is maximum at the perimeter of said enclosure and which decreases radially toward the center, (d) maintaining the temperature of said enclosure within said temperature range until individual crystallized nuclei from the original synthetic mica charge have been dissolved, and (e) cooling said enclosure at a controlled rate not exceeding 10° C. per hour, contact being maintained between the refractory sheets and the molten charge throughout the crystallization period thereby promoting lateral crystal growth, crystallization of said synthetic mica occurring first at the center of said enclosure and then proceeding radially toward the perimeter thereof.

6. The method of growing essentially single crystal sheets of synthetic mica comprising the steps of (a) inserting a pair of refractory metal sheets with a finely divided substantially pure synthetic mica charge interposed therebetween between a pair of mating compression members having oppositely located first and second depressions therein, said mica charge being located in the volume encompassed by said depressions and having a volume equal to that required to fill said depressions with synthetic mica at its crystal density, (b) bringing the peripheries of said metal sheets into contact with each other under pressure to produce a sealed enclosure surrounding said charge, (c) raising the temperature of said enclosure above the melting point of said synthetic mica to a temperature in the range 1380° C. to 1390° C. to produce a thermal gradient which is maximum at the perimeter of said enclosure and which decreases radially toward the center, (d) maintaining the temperature of said enclosure within said temperature range for about one hour until individual crystalline nuclei from the original synthetic mica charge have been dissolved, and (e) cooling said enclosure through the freezing point of said synthetic mica at a controlled rate up to 3° C. per hour, contact being maintained between the refractory sheets and the molten charge throughout the crystallization period thereby promoting lateral crystal growth, the crystallization of said synthetic mica occurring first at the center of said enclosure and then proceeding radially toward the perimeter thereof.

7. The method of growing essentially single crystal sheets of synthetic mica comprising the steps of
   (a) placing a finely divided substantially pure synthetic mica charge between a pair of refractory metal sheets,
   (b) inserting said refractory metal sheets with said charge interposed therebetween between a pair of mating compression members having oppositely located first and second depressions, said mica charge being located in the volume encompassed by said depression and having a volume equal to that required to fill said depressions with synthetic mica at its crystal density, the total depth of said first and second depressions being substantially equal to the thickness of the desired sheet of synthetic mica,
   (c) bringing the peripheries of said metal sheets into contact with each other under pressure to produce a sealed enclosure surrounding said charge,
   (d) raising the temperature of said enclosure above the melting point of said synthetic mica to a temperature in the range 1380° C. to 1390° C. to produce a thermal gradient which is maximum at the perimeter of said enclosure and which decreases radially toward the center,
   (e) maintaining the temperature of said enclosure within said temperature range for about one hour until individual crystalline nuclei from the original synthetic mica charge have been dissolved, and
   (f) cooling said enclosure through the freezing point of said synthetic mica at a controlled rate in the range 1° to 3° C. per hour, contact being maintained between the refractory sheets and the molten charge throughout the crystallization period thereby promoting lateral crystal growth, the crystallization of said synthetic mica occurring first at the center of said enclosure and then proceeding radially toward the perimeter thereof.

8. Apparatus for growing essentially single crystal synthetic mica sheets from finely divided synthetic mica comprising
   (a) first and second mating coaxial compression members, at least one of said compression members having a centrally located depression in the mating surface thereof,
   (b) first and second refractory sheets adapted for receiving therebetween said finely divided synthetic mica, said first and second refractory sheets being compressed about their periphery by translation of said compression members to form a confined enclosure for said synthetic mica, and
   (c) means for heating said enclosure above the melting point of said fluorphlogopite mica, said means producing a thermal gradient in said enclosure having a minimum temperature at the center thereof and increasing to a maximum at the periphery thereof.

9. Apparatus for growing essentially single crystal synthetic mica sheets from finely divided synthetic mica comprising
   (a) first and second coaxial compression members, the adjacent surfaces of said compression members each having a centrally located depression therein,
   (b) first and second refractory sheets adapted for receiving therebetween said finely divided synthetic mica, said first and second refractory sheets being compressed about their periphery by translation of said compression members to form a confined enclosure for said synthetic mica, and
   (c) induction heating means surrounding said confined enclosure, said means producing a thermal gradient in said enclosure having a minimum temperature at the center thereof and increasing to a maximum at the periphery thereof.

References Cited
UNITED STATES PATENTS

| | | | |
|---|---|---|---|
| 2,516,983 | 8/1950 | Hatch | 23—110 X |
| 2,631,222 | 3/1953 | Niebling | 219—10.53 X |
| 2,645,060 | 7/1953 | Waggoner | 23—110 X |
| 2,932,564 | 4/1960 | Evans | 23—110 X |
| 3,034,871 | 5/1962 | Stewart | 23—301 |
| 3,056,653 | 10/1962 | Slayter | 23—273 |

OTHER REFERENCES

Hatch, et al.: Synthetic Mica Invest., Bureau of Mines, Report 5337, June 1957, pp. 32 to 34 and pp. 44 to 45.

Kendall, et al.: "Synthetic Mica," Proceedings of International Congress of Pure and Applied Chemistry, 1947, pp. 167 to 170.

Valkenburg, et al.: Journal of Research of the National Bureau of Standards, vol. 48, No. 5, May 1952, research paper No. 2323, pp. 360 to 369.

NORMAN YUDKOFF, *Primary Examiner.*

S. J. EMERY, *Assistant Examiner.*